Sept. 26, 1939. M. H. TUFT ET AL 2,174,310
BEET LIFTER
Filed May 24, 1937 4 Sheets-Sheet 1

WITNESS
Norman C. Westling

INVENTOR
MILES H TUFT & CLARENCE T. RASMUSSEN
BY
ATTORNEYS

Sept. 26, 1939.　　M. H. TUFT ET AL　　2,174,310
BEET LIFTER
Filed May 24, 1937　　4 Sheets-Sheet 2
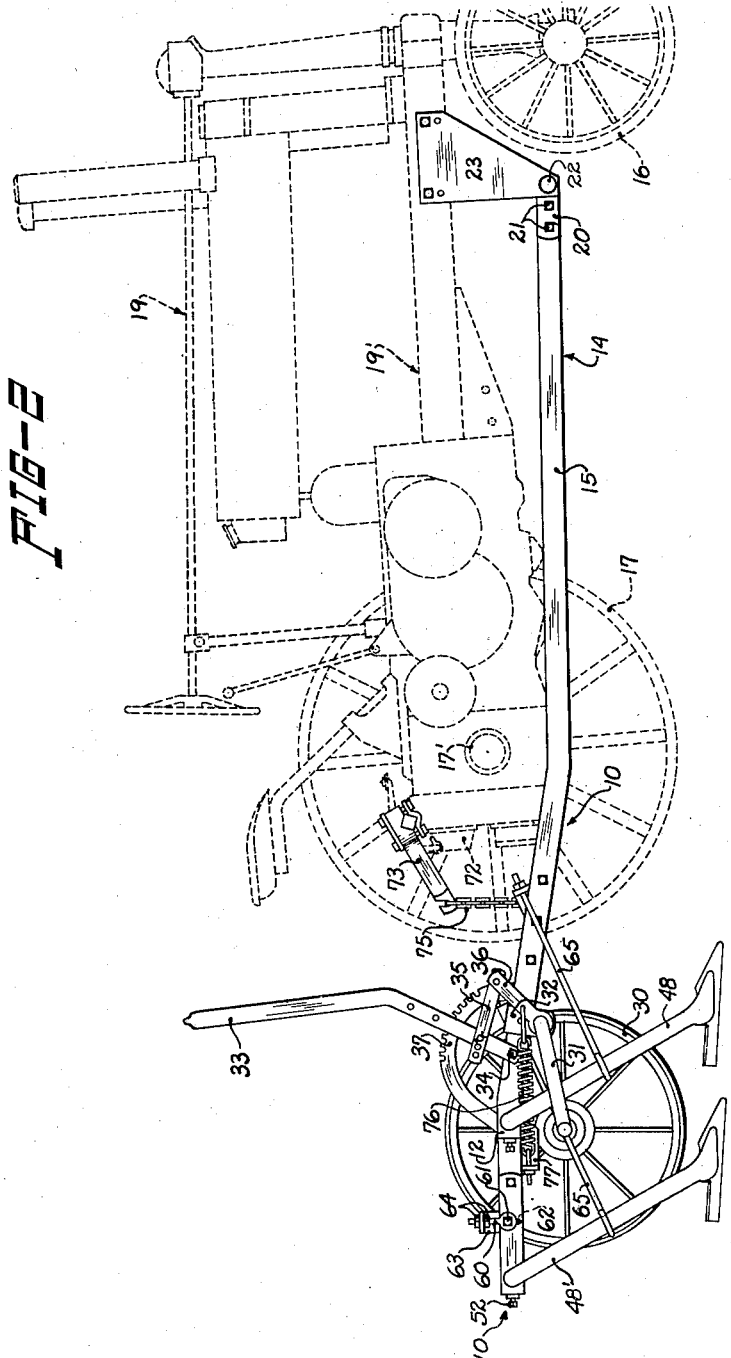
WITNESS
Norman C. Westling
INVENTOR
MILES H. TUFT & CLARENCE T. RASMUSSEN
BY
ATTORNEYS Sept. 26, 1939.   M. H. TUFT ET AL   2,174,310
BEET LIFTER
Filed May 24, 1937   4 Sheets-Sheet 3
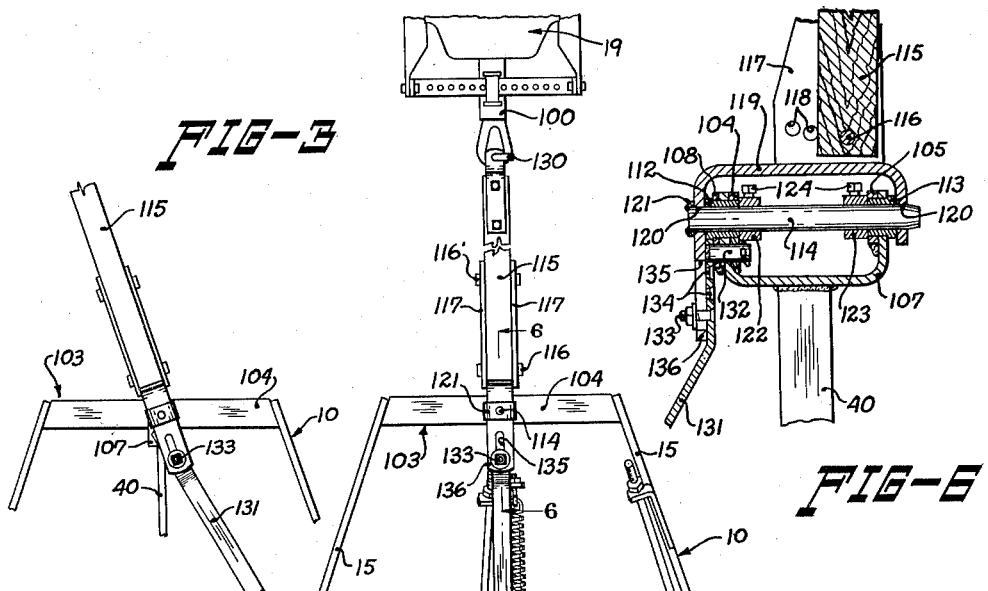
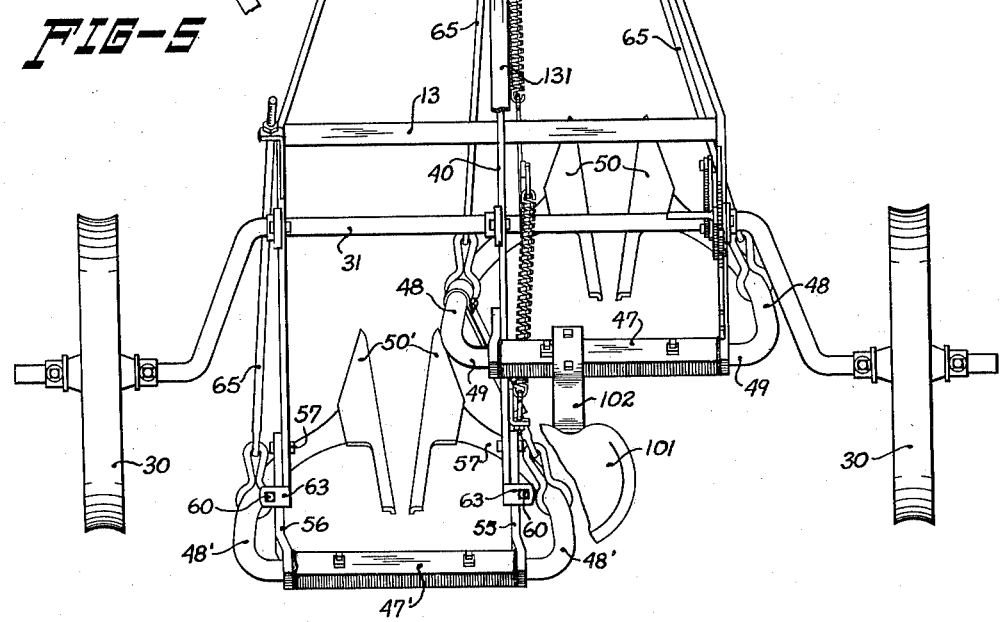
WITNESS
Norman C. Westling
INVENTORS
MILES H. TUFT & CLARENCE T. RASMUSSEN
BY
ATTORNEYS

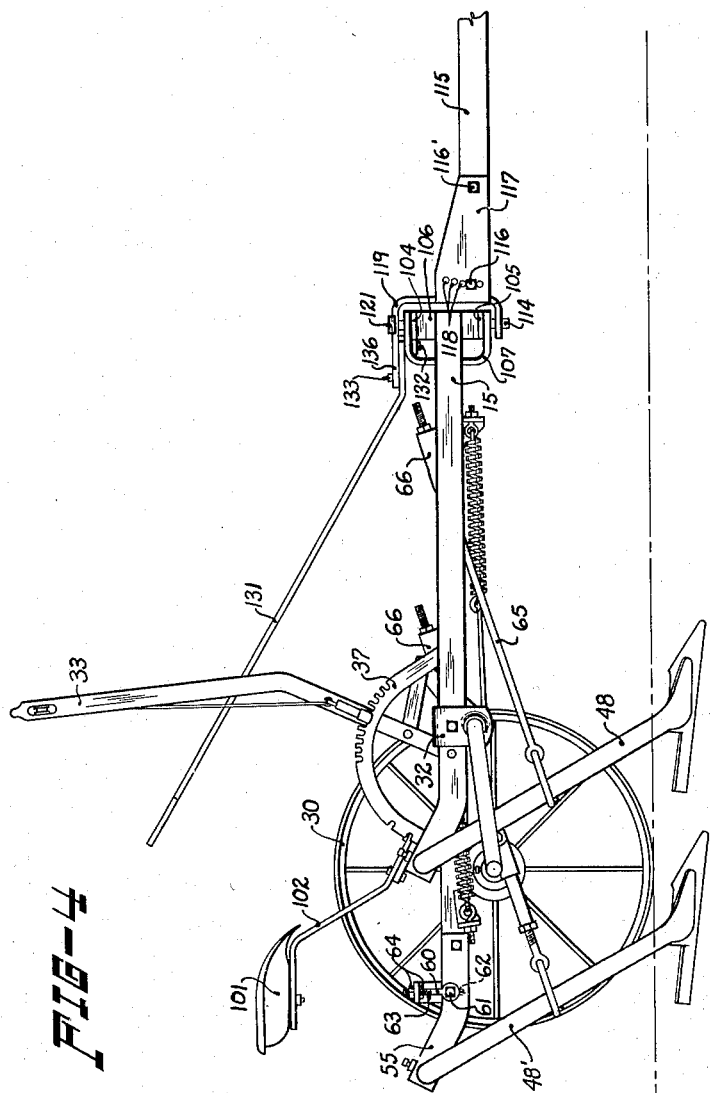

Patented Sept. 26, 1939

2,174,310

UNITED STATES PATENT OFFICE 2,174,310

BEET LIFTER

Miles H. Tuft and Clarence T. Rasmussen, Moline, Ill., assignors to Deere & Company, Moline, Ill., a corporation of Illinois Application May 24, 1937, Serial No. 144,390

5 Claims. (Cl. 55—106)

The present invention relates to beet lifters of the type used in harvesting sugar beets, having a pair of laterally spaced, longitudinally extending blades sloping upwardly and converging toward the rear ends thereof and adapted to be propelled along a row of beets with the blades on opposite sides of the row. The forward ends of the blades are positioned to engage the under surfaces of the beets and as the implement moves forwardly the action of the upwardly sloping blades against the beets raises them out of the ground and drops them on the surface of the ground. In order to be effective, the distance between the blades must be less than the diameter of the smaller beets, and while the forward ends of the blades diverge slightly to accommodate small irregularities in the rows, it is desirable that this divergence be maintained as small as possible, for the draft resistance of the blades in the soil increases greatly as the angle between the bases of the blades is increased. It has, therefore, been found desirable to provide only a small angle of divergence between the blades and to provide a means for accurately steering the implement whereby the operator can guide the blades to accommodate any irregularities in the rows.

To this end, horse-drawn beet lifters are generally provided with a pair of ground engaging steering wheels disposed ahead of the gauge wheels of the implement and operated by foot or hand levers to guide the tools along the rows. In the case of tractor-mounted beet lifters, however, in which either the forward end of the beet lifter frame or the entire frame is supported on a tractor, it has been customary to pivotally connect the frame to the tractor at laterally spaced points, providing for vertical swinging of the beet lifter relative to the tractor, for moving the implement into and out of operating position, but prevented from swinging laterally relative to the tractor by the laterally spaced connections. Thus no provision is made for steering the implement except as it is guided by steering the tractor. In the case of implements mounted behind the tractor, however, it is difficult to guide the tools to accommodate irregularities in the rows because of the fact that as the front wheels of the tractor are turned toward one side of the row, the tools tend to swing toward the opposite side of the row, resulting in damage to the beets. In the case of two-row beet lifters disposed behind the tractor and wholly or partially supported thereon, this tendency to swing in the opposite direction to that in which the front wheels are turned, is exaggerated by the fact that the earth engaging tools of one row are necessarily offset rearwardly, as well as laterally, from the tools in the other row, whereby the increased distance from the rear set of tools to the tractor results in a substantial lateral deflection which causes appreciable damage to the beets unless the angle of divergence is set at an excessive value. It is therefore an object of the present invention to obviate this difficulty by providing a tractor-mounted beet lifter which is connected to the tractor at a single point of support, to permit lateral swinging of beet lifter relative to the tractor and thus eliminate the tendency for the tools to be swung laterally in the opposite direction from that in which the dirigible wheels are turned.

A further object relates to positioning the single point of support at a location on the tractor whereby accurate steering of the beet lifting tools is obtained by the steering controls of the tractor. In the accomplishment of this object the implement is provided with a long draft member which extends forwardly beneath the tractor to a point of support as close as possible to the axis of the front wheels of the tractor. This front connection provides for lateral swinging of the implement frame relative to the tractor, whereby guiding the front of the tractor in one direction causes a like deflection of the tools in the same direction. In this manner the beet lifter can be accurately guided to accommodate irregularities in the rows, by means of the tractor steering mechanism.

Another object of our invention is concerned with means for adjusting one set of beet lifting tools on a two-row implement both laterally and vertically relative to the other set of tools. Since it is important that each pair of blades is accurately positioned relative to the row of beets upon which it operates, it is not sufficient, when adjusting the implement for depth of operation and when adjusting the angle of penetration of the tools, to adjust both sets of tools simultaneously.

These and other objects will be apparent after a consideration of the following detailed description of specific embodiments of our invention, reference being had to the accompanying drawings, in which Figure 1 is a plan view of a preferred embodiment of our invention illustrating a two-row beet lifter of the type in which the front end is supported on the tractor.

Figure 2 is a side elevation of the embodiment shown in Figure 1, the near wheels of the tractor and implement being omitted for the sake of clarity.

Figure 3 is a plan view of another embodiment in which the forward end of the implement frame is supported on the draft bar of the tractor.

Figure 4 is a side elevation of the embodiment shown in Figure 3, the near wheel being omitted for clarity.

Figure 5 is a fragmentary plan view showing the steering mechanism of the second embodiment set for a position of deflection, and Figure 6 is a sectional elevation taken along a line 6—6 in Figure 3.

Figure 1:
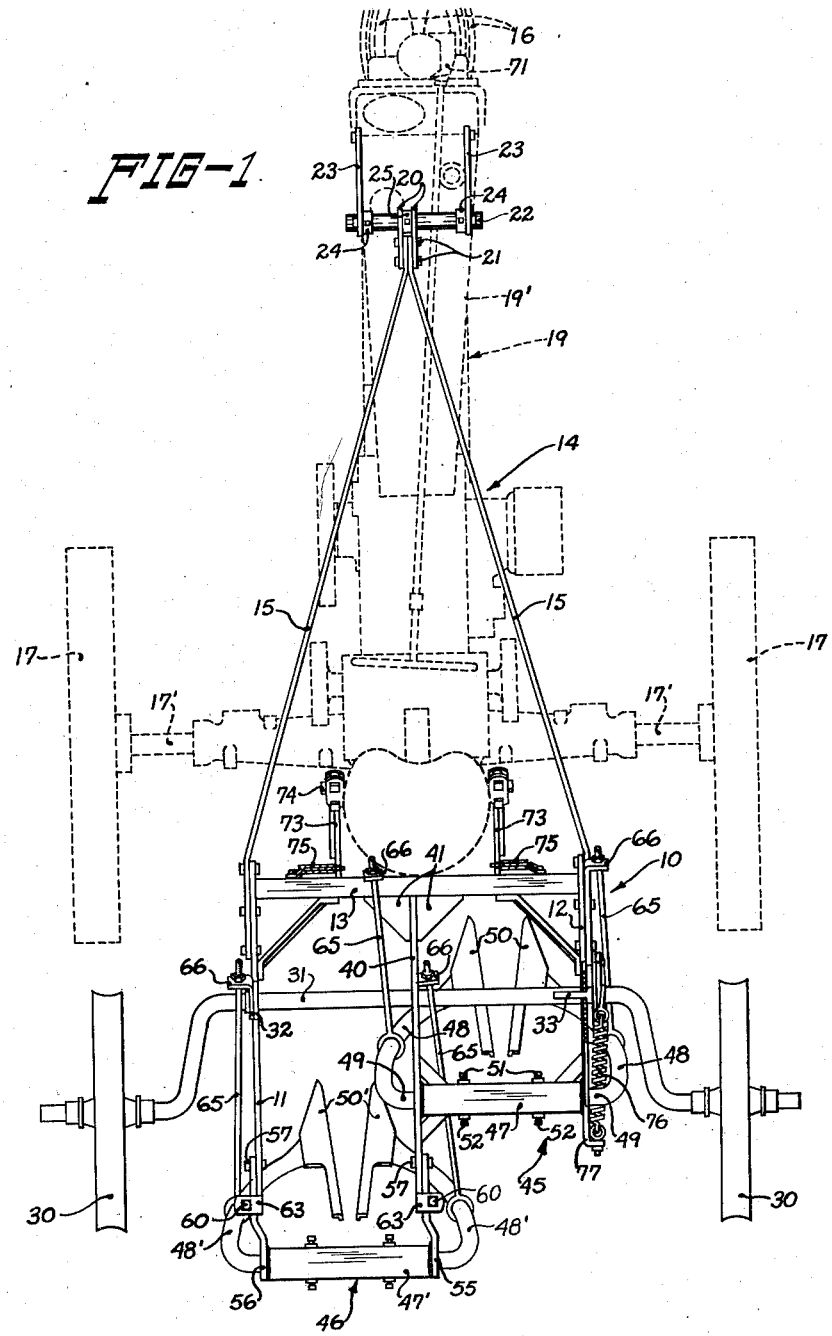

Referring now to the drawings and more particularly to Figures 1 and 2, the beet lifter comprises a substantially horizontally disposed frame 10, comprising a pair of laterally spaced fore and aft extending beams 11, 12 disposed in parallel arrangement behind the tractor 19, indicated by dotted lines as of the tricycle type comprising a body 19' supported on laterally spaced rear traction wheels 17 and a centrally disposed, closely spaced pair of dirigible wheels 16 at the front end of the tractor. The side beams 11 and 12 are held in spaced relation by a cross bar 13 and are connected to the tractor by a draft member 14, comprising a pair of converging bars 15 extending forwardly beneath the tractor to a point of junction appreciably forward of the rear axle 17' and traction wheels 17 of the tractor. The juxtaposed forward ends of the bars 15 are connected to the body 19' of the tractor by a pair of apertured plates 20, bolted to the ends of the bars 15 by bolts 21. A cross bar 22 is inserted through the aligned apertures in the plates 20, each end of the bar being inserted through one of a pair of plates 23 bolted on opposite sides of the body 19'. The crossbar 22 is prevented from moving laterally by collars 24 fixed thereon adjacent the inner sides of the plates 23. The connecting plates 20 are slidable laterally along the bar 22 but are held in adjusted position laterally on the crossbar 22 by a collar 25 which is fixed to the bar 22 between the plates 20. The draft member 14 is free to swing laterally relative to the body of the tractor 19' by virtue of the fact that the apertures in the connecting plates 20 are somewhat larger than the crossbar 22 and are spaced sufficiently close together to give the effect of a single point of support.

We do not intend our invention to be limited to this particular supporting means, for obviously other means for connecting the draft member to the tractor, giving the effect of a single point of support to provide for lateral swinging, will be apparent to any skilled workman. The loose connection of the plates 20 on the bar 22 also provides for vertical swinging of the frame 10 with respect to the tractor.

The rear portion of the frame 10 is supported on a pair of ground-engaging wheels 30, each of which is disposed directly behind the corresponding traction wheel 17 of the tractor. The wheels 30 are journaled on a U-shaped crank axle 31 which is journaled in bearing plates 32, attached to the side beams 11 and 12, respectively. Angular adjustment of the crank axle 31 is effected by a hand lever 33 pivoted by bolt 34 to the side beam 12 and connected by a link 35 to an arm 36 fixed on the crank axle 31. The crank axle is held in adjusted position relative to the frame 10 by a notched sector 37 fixed to the frame 10 and engaging a latch on the lever 33. Thus by means of the hand lever 33, the rear end of the frame 10 can be set at any desired level above the surface of the ground during operation, for the purpose of determining the depth of penetration of the tools.

Midway between the two side beams 11 and 12 of the frame 10 is disposed a third, or middle beam 40, fixed at its forward end to the crossbar 13 and braced by gusset plates 41. A pair of beet lifting tool assemblies 45, 46 are supported between the middle beam 40 and each of the side beams 11 and 12, respectively.

Each of the assemblies is preferably of the type described in detail in a co-pending Tuft application, now Patent 2,119,835, to which reference may be had if desired. Briefly, the right-hand tool assembly 45 comprises a hollow supporting sleeve 47 of rectangular cross section supported transversely between the middle beam 40 and the outer side beam 12 of the frame. At each end of the sleeve is a forwardly and downwardly extending blade supporting arm 48, the upper ends 49 of which are turned into opposite ends, respectively, of the sleeve 47. At the lower end of each of the arms 48 is fixed a fore and aft extending ground-engaging blade 50. These cooperative blades 50 can be adjusted to any desired lateral spacing by sliding the arms laterally within the sleeve 47, and the angle between the blades and the horizontal can be adjusted by swinging the arms within the sleeves. The angle of convergence between the blades 50 can be adjusted by adjusting the horizontal angular positions of the upper ends 49 of the arms 48 within the sleeve 47, as described in the above mentioned application. The blades are then fixed in adjusted position by means of a pair of set screws 51 threaded into the forward side of the sleeve 47 and a pair of set screws 52 threaded into the rear side of the sleeve 47.

The left-hand tool assembly 46 is similar to the right-hand assembly 45 but the manner of supporting the sleeve 47' on the frame is modified to provide vertical and lateral adjustments of the sleeve relative to the frame, independently of the other tool assembly 45. To each end of the sleeve 47' is fixed a bar 55, 56, respectively. These bars extend forwardly and are each pivoted by means of a bolt 57 to the middle beam 40 and to the left-hand side beam 11, respectively, for vertical swinging movement. Thus, in addition to the adjustments of the arms 48' in the sleeve 47', the entire assembly 46 can be adjusted vertically by pivoting the arms 55, 56 about the bolts 57. This provides an adjustment by means of which the left-hand assembly 46 can be raised or lowered relative to the frame and to the right-hand assembly 45 independent of any of the adjustments of the relative positions of the blades 50'. The arms 55, 56 are fixed in adjusted angular position relative to the frame beams 11 and 40 by means of a pair of eyebolts 60, the heads of which are fixed to the pivoted bars 55, 56, respectively, by means of bolts 61 inserted through the eye of the bolt 60 and through aligned apertures in the pivoted bar 55 and frame beam 40, and in the pivoted bar 56 and frame beam 11, respectively. The apertures 62 in the frame beams 11 and 40, as indicated in Figure 2, are elongated vertically to accommodate pivotal movement of the pivoted bars 55, 56. Each of the eyebolts 60 extends upwardly through an aperture in a bracket 63 which is rigidly fixed, as by welding, to the end of each of the frame beams 11 and 40, respectively. Lock nuts 64, threaded on the bolt 60 above and below the bracket 63, respectively, serve to fix the angular positions of the bars 55 and 56 with respect to the frame beams 11 and 40.

Provision is also made for shifting the entire tool assembly 46 laterally relative to the frame 10, in order to adjust for different row spacings to obtain a greater adjustment than is possible by sliding the arms 48' laterally in the sleeve 47'. This adjustment is accomplished by virtue of the fact that the rear ends of each of the pivoted arms 55 are offset laterally from the forward ends, both being offset in the same direction, as shown in Figure 1. After the tool-carrying arms 48' are removed from the sleeves 47', the arms 55 and 56 can be disconnected from the frame beams 11 and 40 and the sleeve 47' can then be reversed end for end and reconnected to the frame bars, after which the offset is in the opposite direction to that shown, thus the sleeve 47' is shifted laterally on the frame relative to the other sleeve 47.

Each of the arms 48, 48' are braced against forces exerted upon them, due to the ground resistance as the implement moves forwardly, by means of tie rods 65. Each of the rods 65 is connected to its respective arm at an intermediate point thereon and extends upwardly and forwardly to a bracket 66 fixed to one of the members of the frame 10.

It is evident that in operation, the beet lifter is quickly responsive to changes in direction effected by control of the forward dirigible wheels 16 through the conventional steering control mechanism 71, since the connection of the implement draft member 14 to the tractor is disposed as closely as possible behind the dirigible wheels 16. Furthermore, due to the single point support at the forward end of the frame and to the independent ground wheel support at the rear of the frame, the implement is unaffected by tilting of the tractor. The beet lifter can be raised out of ground-engaging position for purposes of transporting, by means of the conventional power lift mechanism 72 of the tractor acting through a pair of laterally spaced arms 73 clamped at opposite ends of the actuating rock shaft 74 of the power lift 72 and connected to the frame 10 by chains 75. If no power lift mechanism is available, the frame can be lifted by cranking the crank axle 31 by means of the hand lever 33, to a position in which the blades 50 are clear of the ground, in which case the rear end of the frame is transported on the ground wheels 30. The operator is assisted in lifting the frame by the hand lever 33 by means of a tension spring 76, connected between the crank arm 36 and a bracket 77 fixed to the side beam 12.

Referring now more particularly to Figures 3 to 6 inclusive, the details of construction of the second embodiment of our invention are similar in all essential respects to those in the preferred embodiment described above, except that instead of the draft member being connected beneath the forward ends of the tractor 19, it is swingably connected to the tractor drawbar 100 whereby the entire implement is disposed behind the tractor. In this embodiment, as well as in the preferred embodiment, any tendency for the beet lifting tools to deflect laterally in the direction opposite that in which the dirigible wheels of the tractor are turned is eliminated by the provision for lateral swinging, but in this case there is substantially no steering effect accomplished by means of the tractor steering control mechanism, and therefore it is necessary for a second operator to ride on the beet lifter and steer it during operation. A seat 101 for the operator is carried on a support 102, which is fixed to one of the transverse sleeves 47. Since most of the details of the beet lifter frame and tool assemblies are similar to those already described, it is not deemed necessary to repeat the description for this embodiment, but like reference numerals are given to those parts which are similar to parts in the preferred embodiment.

In the second embodiment the converging members 15 of the draft member 14 are terminated at a comparatively short distance ahead of the cross beam 13 and are connected by a transversely extending member 103, which comprises a pair of upper and lower bars 104, 105, the adjacent ends of which are connected by short vertically disposed plates 106 to which the converging side beams 15 are fixed, as indicated in Figure 4. In this embodiment the middle beam 40 of the frame is extended past the crossbar 13 to a point adjacent to the transverse member 103 and is welded at its forward end to a U-shaped member 107, (see Figure 6) which extends vertically between the two crossbars 104, 105, and each arm of the member 107 is welded to its associated crossbar 104, 105, respectively. A small reinforcing plate 108 is welded to the upper arm of the U-shaped member 107 to provide additional bearing surface for the pins which will be mentioned later. Each of the arms of the U-shaped member 107 is apertured to receive vertically extending bushings 112, 113, which extend through aligned apertures in the associated crossbars 104, 105. The upper bushing 112 extends further through an aperture in the reinforcing plate 108. The two bushings 112 and 113 are aligned vertically and adapted to receive a coupling pin 114 which is rotatable within the bushings, and serves to pivotally connect a forwardly extending draft tongue 115 to the beet lifter frame 10.

As shown in Figure 6 the draft tongue 115 is connected by a bolt 116 to a pair of side plates 117 in any of a plurality of vertically spaced openings 118 in the plates, by means of which the tongue can be adjusted angularly in a vertical plane about the pivot bolt 116' to raise and lower the hitch point, as will be readily understood. The side plates 117 are welded on opposite sides of a U-shaped member 119 which spans the outer ends of the bushings 112 and 113 and has aligned apertures 120 in the two legs for receiving the coupling pin 114. A cap 121 is welded to the upper end of the coupling pin 114 and extends across the top of the member 119, and has downwardly turned ends at each side of the member 119. The purpose of this cap is to prevent the pin 114 from dropping out of position and for preventing it from rotating relative to the U-shaped member 119. The pin 114 and its associated parts are held in cooperative position by a pair of collars 122 and 123 fixed by means of set screws 124 to the pin at the inner ends of the bushings 112 and 113, respectively.

The draft tongue 115 is coupled to the drawbar 100 of the tractor by means of a vertical coupling pin 130 inserted through aligned openings in the tongue and drawbar, by virtue of which the tongue is swingable both in vertical and lateral directions. During normal operation the draft force is transmitted from the tractor through the drawbar 100 to the draft tongue and through the coupling pin 114 to the frame

10 of the beet lifter in a straight longitudinal direction. Since in this embodiment the beet lifter is substantially unresponsive to steering control by the tractor for the purpose of accommodating slight irregularities in the beet rows, a steering device has been provided, by means of which the operator on the implement seat 101 can steer the implement independent of the tractor. Steering is accomplished by means of an upwardly and rearwardly extending steering handle 131 which is pivotally connected to the U-shaped member 107 on the implement frame 10 by means of a pivot pin 132, welded in the lower end of the handle 131 and inserted through aligned apertures in the upper leg of the member 107 and in the upper crossbar 104 and reinforcing plate 108, directly behind the upper bushing 112. A bolt 133 is disposed in one of a plurality of openings 134 in the handle 131 behind the pivot pin 132 and extends through a longitudinally extending slot 135 in the upper leg of the U-shaped member 119, which has an extension 136 provided for this purpose. Hence by swinging the steering handle 131 laterally, the handle operates as a lever about a fulcrum provided by the pin 132 and exerts a force through the bolt 133 against the extension 136, forcing the implement frame 10 to take an angular position relative to the draft tongue 115, as shown in Figure 5, thus causing the beet lifting tools to be deflected to one side or another as desired.

In this embodiment, when not in operation the implement is transported on its frame supporting wheels 30, which can be swung into inoperative position by rotating the crank axle 31 by means of the hand lever 33.

What we claim is:

1. In a two-row beet lifter having a frame, comprising a pair of laterally spaced, longitudinally extending side beams, a third beam disposed therebetween and parallel thereto, a transverse frame member interconnecting said beams, and a draft member extending forwardly from said frame and adapted to be pivotally supported on a tractor for lateral swinging movement relative thereto, ground engaging wheel means for supporting the rear end of said frame, two pairs of laterally spaced, earth engaging tool carrying arms, a supporting sleeve associated with each pair of arms, the upper ends of each pair of arms being turned into opposite ends of said associated sleeve, respectively, one of said supporting sleeves being mounted on said frame between said third beam and one of said side beams, and means for mounting the other of said sleeves on said frame for vertical adjustment relative thereto, said last named means comprising a pair of laterally spaced bars fixed to said sleeve, means for pivotally connecting said bars to said third beam and to the other of said side beams, respectively, for vertical swinging movement, and means for adjustably fixing said bars in angularly adjusted position relative to said frame.

2. In a beet lifter having a frame, a pair of laterally spaced, earth engaging tool carrying arms, a supporting sleeve for said arms, the upper end of each of said arms being turned into opposite ends of said sleeve, respectively, and means for supporting said sleeve transversely on said frame including a pair of bars attached at opposite ends of said sleeve, respectively, and means for attaching said bars to said frame, the ends of said bars connected to said frame being offset laterally from the other ends thereof, whereby said sleeve can be shifted laterally with respect to said frame, by reversing said sleeve with its attached offset arms, end for end, relative to the frame.

3. In a two-row beet lifter having a frame, two pairs of laterally spaced, earth engaging tool carrying arms, a supporting sleeve associated with each pair of arms, the upper ends of each pair of arms being turned into opposite ends of said associated sleeve, respectively, one of said supporting sleeves being mounted on said frame, and means for mounting the other of said sleeves on said frame for vertical adjustment relative thereto, said last named means comprising a pair of laterally spaced bars fixed to said sleeve, means for pivotally connecting each of said bars to said frame for vertical swinging movement, and means for adjustably fixing said bars in angularly adjusted position relative to said frame, the ends of said bars connected to said frame being offset laterally in the same direction from the other ends thereof, whereby said sleeve can be shifted laterally with respect to said frame, by reversing said sleeve with its attached arms, end for end, relative to the frame.

4. In a two-row beet lifter, a frame comprising a pair of laterally spaced, longitudinally extending side beams, a third beam disposed between said side beams, and a transverse frame member interconnecting said beams, a first supporting sleeve supported between said third beam and one of said side beams, a second supporting sleeve, means for supporting said second sleeve between said third beam and the other of said side beams, said last named means being adjustable vertically relative to said frame, two pairs of earth engaging blade supporting arms, each pair of arms having their upper ends turned into opposite ends of said sleeves, respectively, means for adjustably fixing said arms in said sleeves, ground wheel means for supporting the rear end of said frame, and means comprising a draft member extending forwardly from said frame for pivotally supporting the front end on a tractor for lateral swinging movement relative thereto.

5. In a two-row beet lifter, a frame comprising a pair of laterally spaced, longitudinally extending side beams, a third beam disposed between said side beams, and a transverse frame member interconnecting said beams, a first supporting sleeve supported between said third beam and one of said side beams, a second supporting sleeve spaced longitudinally of said frame from said first supporting sleeve, means for supporting said second sleeve between said third beam and the other of said side beams, said last named means being adjustable vertically relative to said frame, two pairs of earth engaging blade supporting arms supported on said sleeves, respectively, the inner arms of each pair being disposed in overlapping relation to each other, ground wheel means for supporting the rear end of said frame, and means comprising a draft member extending forwardly from said frame for pivotally supporting the front end on a tractor for lateral swinging movement relative thereto.

MILES H. TUFT.
CLARENCE T. RASMUSSEN.